3,159,539
WATER-SOLUBLE ANTISEPTIC AGENT
Meyer Mendelsohn, New York, and Carl Horowitz, Brooklyn, N.Y., assignors, by mesne assignments, to Yardney International Corp., New York, N.Y., a corporation of New York
No Drawing. Filed Apr. 16, 1958, Ser. No. 728,772
4 Claims. (Cl. 167—58)

The present invention relates to antiseptic compounds and solutions thereof to be used directly or in combination with other materials for their inherent antiseptic properties.

This application is a continuation-in-part of co-pending, presently abandoned application Ser. No. 477,432, filed December 23, 1954, as continuation-in-part of application Ser. Nos. 364,970 and 379,102, filed June 29, 1953, and September 8, 1953, respectively, and now both abandoned.

It has been known that silver salts possess certain oligodynamic antiseptic properties. Conventional organic silver salts, however, either are colloidal in nature and contain only very small amounts of silver or are ionizable compounds which are extremely irritating to living tissue and from which the silver is easily precipitated by the addition of even small concentrations of halide ions. Among the colloidal materials there may be mentioned silver alginate which forms gelatinous suspensions and has a silver content of, at most, only a few percent. Silver alginate, in addition, is extremely photo-sensitive and suspensions or gels of this material in the presence of light decompose with the liberation of metallic silver. The silver salt of its monomer, silver mannuronate, ionizes to a considerable extent and is rapidly decomposed by dissolved silver-precipitating salts including the sodium chloride of normal saline solutions or body fluids.

It is an object of this invention to provide a novel highly effective antiseptic compound.

It is a further object of this invention to provide novel and highly effective antiseptic preparations, based on the novel compound, which are non-toxic and non-irritating when applied to skin tissues.

It is another object of this invention to provide an antiseptic agent whose effectiveness extends over a wide spectrum of micro-organisms and which, when administered in at least moderate quantities, is without harmful manifestations.

A further object of this invention is to provide an antiseptic compound which mixes will with soaps, cosmetics and pharmaceutical vehicles for the purpose of imparting significant disinfectant properties to such vehicles.

A still further object of this invention is to provide disinfectant compounds adapted to be used for industrial purposes such as the preservation of foodstuffs, disinfection of surface coatings such as floor waxes, paints and parchment sizes, or control of slime formation during such industrial processes as the manufacture of paper products.

The antiseptic compound according to this invention is a silver salt of a polyuronic acid having a molecular weight in the range of 1,000 to 5,000. Such silver salts are prepared by the reaction of silver with partially depolymerized alginic acid (or partially polymerized mannuronic acid, the latter being the monomeric unit of alginic acid). This polyuronic starting material is particularly suitable since the silver salt it forms is non-colloidal and non-ionized. The silver salt has a silver content ranging from 22–30% and, dependent on the molecular weight, a well-defined melting point in the range of 240°–265° C. The silver compound formed from the starting material having a molecular weight in the above range has an ionization constant below $10^{-9}$. Consequently, solutions of this compound are stable in the presence of halide ions which normally would be expected to precipitate the silver from solution. In addition, as is well known, ionized silver compounds have a coagulative effect upon living tissue with consequent irritation and sloughing.

Moreover, solutions of the compound of this invention while non-ionized are also non-colloidal. These solutions are not peptized by the addition of highly ionized solution of salts, acids or alkalis and are stable in the pH range of 1–14. This is in contrast to the well-known ease of peptonization of colloidal silver compounds.

The compounds of this invention are prepared by the reaction of polyuronic acid with silver compounds. The preferred silver compounds are silver oxide and silver carbonate. The polyuronic acid is best derived from the depolymerization of alginic acid. This depolymerization is most simply carried out by maintaining alginic acid at elevated temperatures for extended periods of time, e.g., from three days to two weeks. By way of example it may be mentioned that maintaining the dry powder at 80° C. for six days reduces the molecular weight of alginic acid (average molecular weight 20,000) by a factor of 10. The depolymerization reaction commences at temperatures of approximately 50° C. and continues at increased rates to temperatures of approximately 100° C. Above that temperature decomposition and dehydration of the material occurs at a faster rate than the depolymerization. The depolymerization reaction is best controlled by determining the viscosities of neutralized solutions of the polyuronic acid obtained. It has been determined that 5% solutions of the polyuronic acid, adjusted by the addition of KOH to a pH range of 6–8, when measured in the Scott viscosimeter at a temperature of 25° C., have viscosity times of 10 to 25 seconds and give indication of molecular weight in the range of 1,000–5,000. Such a polyuronic acid is the preferred starting material for the manufacture of the silver polyuronates of this invention. Alginic acid may also be partially depolymerized to the desired molecular-weight range by other known methods (e.g., as set forth in U.S. Patent No. 2,612,498) or the polyuronates may be obtained through the partial polymerization of mannuronic acids.

A preferred process for producing the silver compound described above is as follows:

Example 1

Alginic acid (average molecular weight 20,000) is partially depolymerized, in the manner described above, to an average molecular weight of 2,000±10% as determined by standard viscosity methods. 10 grams of the resulting yellowish powder is suspended in 200 cc. of distilled water. 20 grams of silver carbonate $Ag_2CO_3$ is added to the suspension with constant stirring for ½ hour. After the evolution of $CO_2$ has subsided, the mixture is heated to 40° C. and the pH is adjusted to approximate neutrality by the addition of 10% KOH. Stirring is continued and the temperature is maintained for 2 hours. The mixture is thereafter permitted to cool and stand overnight. On the next day, the clear, brown solution is filtered from the sediment. This liquid, hereafter referred to as solution A, has a pH of 7.8 and assays between 1 and 2% silver by weight. The pure silver salt may be precipitated from solution by adding the reaction mixture to a large quantity of acetone. It precipitates in the form of fine dark-brown platelets having a silver content of 29% by weight and a melting point of 248° C.

The reaction solution A, from which the pure silver salt was precipitated, is adjusted by dilution to a silver content of approximately 1%. This product is effective against a wide spectrum of micro-organisms including both gram-positive and gram-negative bacteria. Bacteriocidal action was observed against the following organisms: E. coli, M. pyogenes v. aureus, S. typhosa (Hopkins).

This product as evaluated by standard topical comparison tests is substantially completely non-irritating. The tests were of the usual fashion where the product and a "green soap NF" control were applied to opposite sides of scapular areas on test subjects. The tests showed a much higher incidence of irritation by the control than with the product being tested. Similarly, the product when tested by application to the thighs of new-born infants was found to have little or no irritating properties.

Further tests were performed to determine the ability of the silver polyuronate of this invention to penetrate the skin when topically applied. A radioactive form of the product, produced by employing $Ag^{110}$ isotope in its preparation, was used for this test. The material was applied over large areas on either side of the spine of seventeen rabbits. Thereafter, a mixture of the radioactive product with a wetting agent was rubbed into the skin for 5 consecutive days and the animals were sacrificed on the 6th day. Organ analysis, carried out by scintillation counters and radioautographs on the large intestine, small intestine, adrenals, liver and spleen of all the animals, showed freedom from radioactive silver. Four of the seventeen rabbits showed some very slight radioactivity of the lungs and pleura. The animals with lung and pleura involvement showed no gross evidence of trauma. It was established, therefore, that the risk of internal silver deposition from topical application of the product is negligible.

The compound of this invention has bacteriostatic properties in dilutions containing as little as 0.001% silver but is most effective when the silver content of its solutions is above 0.01%.

*Example 2*

5 grams of partially depolymerized alginic acid having a viscosity indicating a molecular weight of 2500 is reacted with 5 grams of silver peroxide. The mixture is agitated for 2 hours and then adjusted with potassium hydroxide to a pH of 12. Agitation is continued for one hour and the solution is neutralized (pH 7) by the addition tartaric acid. This solution has a silver content of 1.9%. The silver salt, acetone-precipitated as described in Example 1, resulting from this reaction assays 29% silver and has a melting point of 251° C. The silver polyuronate is soluble in water and the solutions are non-ionized and possess no colloidal properties. The silver polyuronate, formed as above, is dissolved in an aqueous solution of polyvinylpyrrolidone and is adjusted to have a silver content of 1%. The preferred polyvinylpyrrolidone for this solution is the grade having an average molecular weight of 40,000 and of pharmaceutical purity, such material being available from Antara Products under the trade name Plasdone. The resulting liquid, containing approximately 20% of the film-forming polymer and 1% of silver combined as silver polyuronate, possesses excellent film-forming properties. Films of this material applied to the skin are non-irritating and render the area of application free from resident and transient bacteria. The solutions prepared according to this example possess the same antimicrobial spectrum as the solutions of Example 1. The compatibility of such film-forming solutions with a wide range of organic compounds renders them extremely useful for incorporation into a large variety of industrial products, including furniture polish and floor waxes, for the purposes of imparting to such products their disinfectant properties.

We claim:

1. A composition of matter adapted to be applied to a living surface to obtain release of $Ag^+$ ions on said surface, comprising a water-soluble silver salt of partially depolymerized alginic acid having an average molecular weight in the range of substantially 1,000 to 5,000 and a melting point in the range of 240° to 265° C., and a base material selected from the group which consists of soaps, cosmetics and pharmaceutical vehicles.

2. An antimicrobial product adapted to be applied to a living surface to obtain release of $Ag^+$ ions on said surface, comprising a solution of a water-soluble silver salt of partially depolymerized alginic acid having a melting point substantially in the range of 240° to 265° C. and a silver content in the range of 20 to 39% by weight, said salt being present in said solution in amounts sufficient t oprovide a proportion of more than 0.01%, by weight, of silver in the solution.

3. An antimicrobial product according to claim 2 wherein the solution of said salt includes a film-forming agent.

4. An antimicrobial product according to claim 3 wherein said agent is polyvinylpyrrolidone.

References Cited in the file of this patent

UNITED STATES PATENTS

| | | |
|---|---|---|
| 2,155,361 | Myers | Apr. 18, 1939 |
| 2,161,861 | Gerlough | June 13, 1939 |
| 2,194,677 | Schneiderwirth | Mar. 26, 1940 |
| 2,513,416 | Le Gloahec | July 4, 1950 |
| 2,612,498 | Alburn | Sept. 30, 1952 |
| 2,665,211 | Roland | Jan. 5, 1954 |
| 2,782,190 | Fischer et al. | Feb. 19, 1957 |
| 2,906,761 | Mendelsohn | Sept. 29, 1959 |
| 2,983,722 | Horowitz et al. | May 9, 1961 |
| 3,050,467 | Horowitz et al. | Aug. 21, 1962 |

FOREIGN PATENTS

| | | |
|---|---|---|
| 756,710 | Great Britain | Sept. 5, 1956 |

OTHER REFERENCES

Nelson: J. American Chemical Society, vol. 51, January-June 1929, pp. 1914–22.

Hawk et al.: "Practical Physiological Chemistry," 11th Ed. (1937), P. Blakiston's Son and Co., Philadelphia; pp. 1–4.

Pigman et al.: "Chemistry of the Carbohydrates," Academic Press Inc., N.Y., 1948, p. 611.

Amer. Dyestuff Reporter, vol. 43, No. 6, March 15, 1954, p. 27A.

Sasaki et al.: "Thixotropy of Alginate Gels," Bull. Chem. Soc. Japan, vol. 29, No. 1, pp. 32–35, January 1956.